US006879937B2

(12) United States Patent
Streiter

(10) Patent No.: US 6,879,937 B2
(45) Date of Patent: Apr. 12, 2005

(54) METHOD FOR ECONOMIC EVALUATION OF A FACILITY

(75) Inventor: Peter Streiter, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 10/166,310

(22) Filed: Jun. 11, 2002

(65) Prior Publication Data

US 2003/0078824 A1 Apr. 24, 2003

(30) Foreign Application Priority Data

Jun. 11, 2001 (DE) ........................................ 101 28 261

(51) Int. Cl.[7] ................................................ G06F 17/60

(52) U.S. Cl. ...................................................... 702/183

(58) Field of Search ................................ 702/183, 186; 705/27, 36, 40, 29, 400, 7, 37, 2, 38, 26, 8; 424/93; 379/114; 800/278; 434/167; 703/1; 700/36, 236; 709/200, 201, 224; 707/3, 1, 102; 342/357; 382/226; 435/7, 6, 7.1; 345/733, 765, 781

(56) References Cited

U.S. PATENT DOCUMENTS 4,011,545 A * 3/1977 Nadir ......................... 709/200
5,277,188 A 1/1994 Selker
6,038,554 A * 3/2000 Vig ............................ 705/400
2002/0035520 A1 * 3/2002 Weiss .......................... 705/27

FOREIGN PATENT DOCUMENTS

DE 692 28 685 T2 8/1999
DE 100 02 305 A1 8/2000
DE 100 64 789 A1 7/2001

OTHER PUBLICATIONS

Morneburg (Hrsg.), Bildgebende, "Systems fur die Medizinische Diagnostik", Publicis MSD Verlag, Erlangen, 3rd Edition, 1995, pp. 538–540.

* cited by examiner

*Primary Examiner*—Bryan Bui
*Assistant Examiner*—Tung Lau
(74) *Attorney, Agent, or Firm*—Young & Thompson

(57) ABSTRACT

A method for economic evaluation of proper use of a facility in operation.

19 Claims, 2 Drawing Sheets

METHOD FOR ECONOMIC EVALUATION OF A FACILITY

FIELD OF THE INVENTION

The invention relates to a method for economic evaluation of proper use of a facility in operation.

BACKGROUND OF THE INVENTION

Particularly medical instruments of complex design, such as magnetic resonance instruments, can have different equipment features depending on application. Thus, by way of example, a flexible coil assembly is used for orthopedic examinations with a magnetic resonance instrument (cf. Morneburg (ed.), Bildgebende Systeme für die medizinische Diagnostik [Imaging systems for medical diagnostics], Publicis MSD Verlag, Erlangen, 3rd edition 1995, pages 538–540). For a shoulder examination, however, there is also a special surface coil available, which, for a shoulder examination, can be positioned on a patient who is to be examined more quickly and easily than the flexible coil assembly. Increased investment costs as a result of using the special surface coil mean that it only makes economic sense to purchase the special surface coil if the magnetic resonance instrument is used to carry out a relatively large number of shoulder examinations, however.

If a salesperson now wishes to sell special equipment, such as the special surface coil, to an operator of the magnetic resonance instrument, or of an instrument generally, he needs to contact the operator in order to offer the special equipment to him. For many operators, however, there is no economic value in purchasing the special equipment. They therefore do not wish to purchase the special equipment, and the salesperson could have spared himself contacting them. The time which the salesperson spent contacting the operator is therefore wasted time both for the salesperson and for the operator.

SUMMARY OF THE INVENTION

The object of the invention is therefore to specify a method which provides prerequisites for allowing fast and reliable economic evaluation of a facility.

The object of the invention is achieved by a method for economic evaluation of proper use of a facility in operation, having the following method steps:

- those data which are obtained during proper use of the facility and are suitable for describing the proper use of the facility are recorded at the facility's location,
- the data are transmitted to a central database arranged at a location other than the facility's location,
- the transmitted data are categorized according to the type of use of the facility, using an evaluation facility associated with the database,
- on the basis of the categorization, the transmitted data are stored in collective files associated with the type of use,
- on the basis of the categorization of the transmitted data, economic evaluation of the proper use of the facility is effected, and
- on the basis of the economic evaluation, a proposal for modifying the facility is ascertained.

According to the invention, data suitable for describing the proper use of the facility are thus recorded at the facility's location. If the facility is an instrument, the data comprise, by way of example, details relating to times at which the instrument is used, or for which purpose the instrument is used. In the case of a magnetic resonance instrument, the proper use is an examination carried out using the magnetic resonance instrument. The data suitable for describing the proper use can comprise, by way of example, details relating to how many examinations of a particular type are carried out using the magnetic resonance instrument over a particular period of time. The data can also comprise details of whether the instrument has special equipment, and what this is. If the facility is an authority or a department in an industrial enterprise, then the data can comprise, by way of example, details relating to how often and how long particular people use particular instruments, such as copiers or computers.

These data are then transmitted to the central database, where they are categorized according to the type of use thereof. In the case of a magnetic resonance instrument, the type of use can, by way of example, be the type of examination carried out using the magnetic resonance instrument. Thus, by way of example, data associated with a particular examination, such as a shoulder or chest examination, are then stored in files associated with these examinations, so that, by way of example, the salesperson can easily view the data and can evaluate them according to economic aspects. On the basis of this evaluation, the salesperson can then present the operator with an offer for the special equipment. Since the salesperson already knows in advance that the special equipment is of economic value to the operator of the magnetic resonance instrument, he has a good chance of selling the special equipment. He therefore does not need to present an offer to an operator for whom the special equipment is of no economic value and who would therefore probably not wish to buy the special equipment, which saves the operator, in particular, valuable time.

In the case of the authority or of the industrial enterprise, the type of their use can be the use of a computer by an employee of the authority or of the industrial enterprise. A quick check can thus be carried out centrally to determine whether the employee uses his computer often and with which computer programs, so that, if necessary, he can be provided with a better computer. Consequently, the employee's effectiveness and hence his economic benefit to the authority or to the industrial enterprise can be increased.

The evaluation facility can be in a form such that it performs the economic evaluation of the proper use of the facility and ascertains the proposal for modifying the facility. This means that the economic evaluation need no longer be performed manually. Instead, the economic evaluation is automated. In addition, on the basis of the economic evaluation, a proposal for modifying the facility is automatically ascertained immediately. Hence, the salesperson need now only send the ascertained modification to the operator of the facility as an offer.

If, in accordance with another variant of the invention, the facility has a computer which automatically records the data during proper use of the facility, the inventive method can be carried out particularly easily and conveniently. In addition, a prerequisite for secure recording of the data is also provided.

In accordance with another embodiment of the invention, the computer can contact the central database via an information transmission network. This means that the data can be transmitted to the database automatically, in particular.

In another variant of the invention, the central database can contact the computer via an information transmission network. The data can therefore easily be downloaded to the database from the computer.

In accordance with one variant of the invention, the information transmission network is a telephone network, the Internet, an intranet or an extranet. An extranet is an intranet in which at least parts of different intranets are interconnected.

The inventive method can be used particularly well for variants of the invention according to which the facility is a technical installation or an instrument or, in particular, a medical installation or a medical instrument.

In another embodiment of the invention, furthermore, the type of use is an examination carried out using the medical installation or using the medical instrument.

In accordance with another embodiment of the invention, the medical instrument is a magnetic resonance instrument, a computer tomograph, a lithotripter, an ultrasound instrument or an X-ray instrument.

DETAILED DESCRIPTION OF THE INVENTION

An exemplary embodiment is shown by way of example in the appended schematic drawings, in which.

Figure 1:
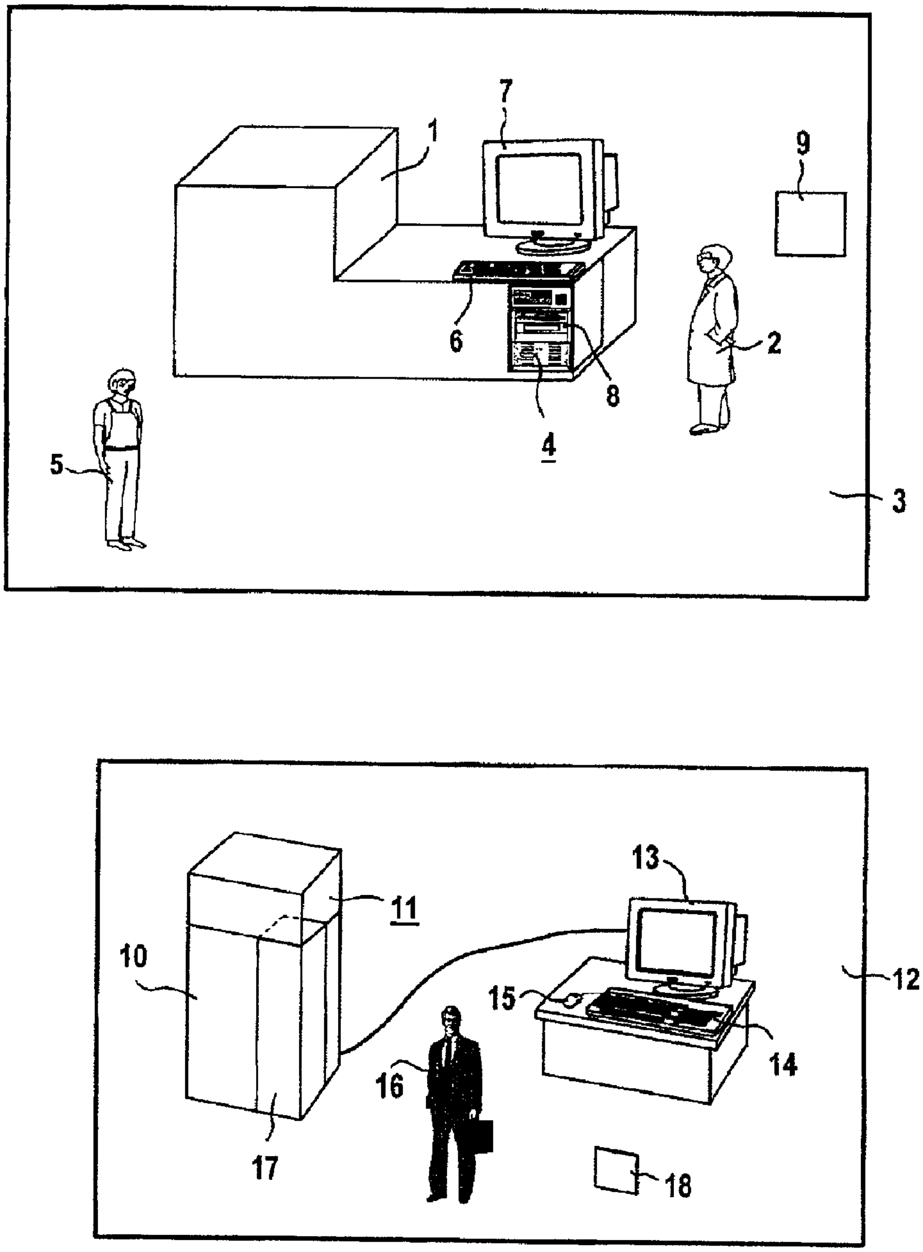
FIG. 1 shows a magnetic resonance instrument and a central database.

FIG. 1 shows, by way of example and schematically, a magnetic resonance instrument 1 belonging to a doctor 2. The magnetic resonance instrument 1 is located in an examination room 3 in a medical practice where the doctor 2 works. The magnetic resonance instrument 1 comprises a control computer 4 which provides suitable control for the magnetic resonance instrument 1 during an examination on a patient 5 using the magnetic resonance instrument 1. The control computer 4 also has a keyboard 6, a monitor 7 and a memory 8, which stores not only data which have been obtained during examination of the patient 5 using the magnetic resonance instrument 1 and are suitable for producing MR images, but also data which are suitable for economic evaluation of proper use of the magnetic resonance instrument 1. These data comprise, in particular, details relating to the type of examination and the time at which the examination using the magnetic resonance instrument 1 is carried out. The type of examination can be inferred from the use of the magnetic resonance instrument 1 during the examination. This is because, before the examination, the doctor 2 uses the keyboard 6 to input the type of examination into the control computer 4, that is to say whether, by way of example, a shoulder examination, a chest examination, a head examination, etc., is to be carried out on the patient 5.

The control computer 4 is also connected to the Internet, which means that it can be contacted by a computer 11 which comprises a database 10, is operated by the manufacturer of the magnetic resonance instrument 1 in the case of the present exemplary embodiment, and is likewise connected to the Internet. The computer 11 comprising the database 10 is, as an aside, in an office 12 of the manufacturer of the magnetic resonance instrument 1 and is equipped with a monitor 13, a keyboard 14 and a computer mouse 15. A salesperson 16 can thus use the keyboard 14 and the computer mouse 15 on the computer 11 comprising the database 10 to contact the control computer 4 for the magnetic resonance instrument 1 over the Internet, in order to download the data suitable for proper use to the database 10 from the control computer 4. In the case of the present exemplary embodiment, the salesperson 16 contacts the control computer 4 using the computer 11 comprising the database 10 roughly once a month.

Figure 2:
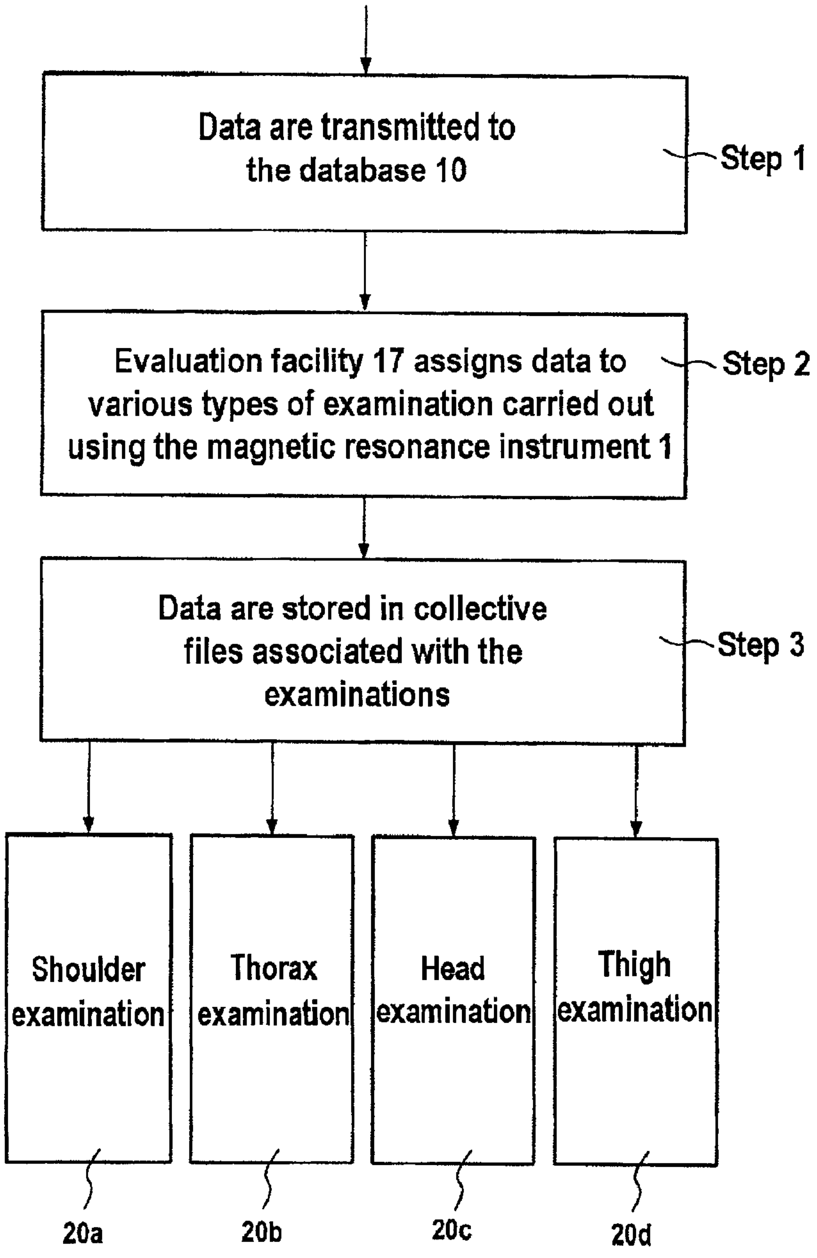
FIG. 2 shows a chart to illustrate evaluation of data transmitted by the magnetic resonance instrument.

The data downloaded to the database 10 are then categorized by an evaluation facility 17, associated with the database 10, of the computer 11 according to the type of examination and are stored in corresponding collective files **20*a* to 20*d*. The categorization is explained in more detail schematically with reference to the chart shown in FIG. 2**.

As already described above, the data are classified, during recording by the control computer 4, according to data types associated with the type of examination using the magnetic resonance instrument 1. When the data have been transmitted to the database 10 (step 1), the evaluation facility 17 assigns them, in the case of the present exemplary embodiment, to the various types of examination by the magnetic resonance instrument 1 on the basis of their data type (step 2). Next, the data are stored, in line with their assignment, in the appropriate collective files **20*a* to 20*d* in the database 10 (step 3). In the case of the present exemplary embodiment, a collective file 20*a* is associated with a shoulder examination, a collective file 20*b* is associated with a chest examination, a collective file 20*c* is associated with a head examination, and a collective file 20*d*** is associated with a thigh examination.

Every examination using the magnetic resonance instrument 1 is provided with a time stamp, so that, in the case of the present exemplary embodiment, the evaluation facility 17 can use a suitable computer program to calculate the number of categorized examinations over a prescribed interval of time. In addition, the manufacturer, and hence also the salesperson 16, knows the equipment features of the magnetic resonance instrument 1 of the doctor 2. The salesperson 16 thus knows, in particular, whether and what special equipment, such as surface coils, are available to the doctor 2 for his examinations using the magnetic resonance instrument 1. In the case of the present exemplary embodiment, the doctor 2 has a flexible coil assembly 9 (shown schematically in FIG. 1) for orthopedic examinations, which he also uses for shoulder examinations.

However, the manufacturer of the magnetic resonance instrument 1 also offers a special surface coil 18 for shoulder examinations. MR images produced using the special surface coil 18 have a higher image quality than MR images produced using the flexible coil assembly 9. In addition, the special surface coil 18 can be positioned on a patient who is to be examined more quickly and more easily than the flexible coil assembly 9. On the basis of the time saved through faster positioning, the salesperson 16 calculated that purchasing the special surface coil 18 is of economic value to a doctor, that is to say also for the doctor 2, if the doctor 2 carries out, by way of example, more than 10 shoulder examinations per day using his magnetic resonance instrument 1. The salesperson 16 used the keyboard 14 to input the result of this calculation into the computer 11 comprising the database 10.

In the case of the present exemplary embodiment, the evaluation facility 17 of the computer 11 thus calculates, in particular, the number of shoulder examinations which the doctor 2 carries out on average per day. The evaluation facility 17 then ascertains whether the doctor 2 carries out more or fewer than 10 shoulder examinations per day on average. If the doctor 2 carries out more than 10 shoulder examinations per day, the monitor 13 displays an indicator for the salesperson 16 that purchasing the special surface coil 18 would make economic sense for the doctor 2, since he carries out more than 10 shoulder examinations on average and does not yet have a special surface coil 18. The salesperson 16 can therefore present the doctor 2 with an offer for the special surface coil 18, which the doctor 2 will probably accept, since purchasing the special surface coil 18 is of economic value to him.

The salesperson 16 likewise calculated for which and after how many examinations using the magnetic resonance instrument 2 other special equipment is of economic value to the doctor 2 and used the keyboard 14 to input these details into the computer 11 comprising the database 10. The evaluation facility 17 can therefore also ascertain if other special equipment is of economic value to the doctor 2, so that the salesperson 16 can present the doctor 2 with an appropriate offer.

The salesperson 16 can also use the computer 11 comprising the database 10 to contact other computers (not shown in FIG. 1) for other magnetic resonance instruments of the manufacturer of the magnetic resonance instrument 2, in order to download data describing the use thereof to the database 11. These data are stored in similarly structured collective files, which are associated with the corresponding operators and are similar to the collective files 20*a* to 20*d* shown in FIG. 2, and are evaluated by the evaluation facility 17. The salesperson 16 can therefore present operators of the other magnetic resonance appliances with offers for special equipment if this is of economic value to the operators. However, the inventive method does not need the evaluation facility 17 to ascertain if special equipment is of economic value. It is also sufficient for the evaluation facility 17 to store the data in the collective files 20*a* to 20*d*, so that the salesperson 16 can view the collective files 20*a* to 20*d* and can then decide whether special equipment is of economic value to the doctor 2 or to another operator of a magnetic resonance instrument.

The inventive method is also not limited to the special equipment described. It can also be used, in particular, for upgrades for the magnetic resonance instruments. Also, the inventive method is not limited to magnetic resonance instruments. It can also be used for other medical instruments, such as, in particular, computer tomographs, lithotripters, ultrasound instruments or X-ray instruments, or else for medical installations or even for non-medical installations or instruments.

In addition, the computer 11 comprising the database 10 does not necessarily have to be located in an office 12 of the manufacturer of the magnetic resonance instrument 1. The database 10 can also be operated by a marketing organization or a sales organization for the magnetic resonance instrument 1. Alternatively, the database 10 can be operated by other institutions, such as by a service provider.

The control computer 4 for the magnetic resonance instrument 1 and the computer 11 comprising the database 10 also do not need to be connected to the Internet. The control computer 4 can also be contacted via another information transmission network, particularly via an intranet, an extranet or a telephone network.

Alternatively, it is possible for the control computer 4 for the magnetic resonance instrument 1 to contact the computer 11 comprising the database 10 via the information transmission network, in order to transmit the data associated with the use of the magnetic resonance instrument 1 to the database 10.

In the case of the present exemplary embodiment, the data associated with the use of the magnetic resonance instrument 1 are ascertained automatically, in particular, by the control computer 4 for the magnetic resonance instrument 1. These data can also be manually ascertained and transmitted to the database 10, however.

What is claimed is:

1. A method for economic evaluation of proper use of a facility in operation, having the following method steps:

those data which are obtaining data during proper use of the facility and are suitable for describing the proper use of the facility are recorded at the facility's location, the data are transmitted to a central database arranged at a location other than the facility's location, the transmitted data are categorized according to the type of use of the facility, using an evaluation facility associated with the database, on the basis of the categorization, the transmitted data are stored in collective files associated with the type of use, on the basis of the categorization of the transmitted data, economic evaluation of the proper use of the facility is effected, and on the basis of the economic evaluation, a proposal for modifying the facility is ascertained, wherein the facility is a medical instrument and one of magnetic resonance instrument, a computer tomograph, a lithotripter, an ultrasound instrument or an X-ray instrument.

2. The method as claimed in claim 1, characterized in that the facility has a computer which automatically records the data during proper use of the facility.

3. The method as claimed in claim 2, characterized in that the computer can contact the central database via an information transmission network.

4. The method as claimed in claim 3, characterized in that the information transmission network is a telephone network, the Internet, an intranet and/or an extranet.

5. The method as claimed in claim 2, characterized in that the central database can contact the computer via an information transmission network.

6. The method as claimed in claim 1, characterized in that the type of use is an examination carried out using the facility.

7. A method for economic evaluation of proper use of a facility in operation, which comprises:

obtaining data during proper use of the facility; said data being suitable for describing the proper use of the facility;

recording said data at the facility's location;

transmitting said data to a central database arranged at a location other than the facility's location;

categorizing transmitted data according to the type of use of the facility, using an evaluation facility associated with the database;

storing the transmitted data in collective files associated with the type of use on the basis of the categorization;

carrying out an economic evaluation of the proper use of the facility on the basis of the categorization of the transmitted data; and ascertaining a proposal for modifying the facility on the basis of the economic evaluation, wherein the facility is a medical instrument and one of magnetic resonance instrument, a computer tomograph, a lithotripter, an ultrasound instrument or an X-ray instrument.

8. The method according to claim 7, wherein the facility has a computer which automatically records the data during proper use of the facility to periodically determine a number of occurrences, in an observation time period, of each of plural types of use of the facility.

9. The method according to claim 8, wherein the computer is configured, independent of operator input, to contact the central database via an information transmission network and to transfer the collected data related to periodically determining the number of occurrences of each of plural types of use of the facility.

10. The method according to claim 9, wherein the information transmission network is a telephone network, the Internet, an intranet and/or an extranet.

11. The method according to claim 8, wherein the central database can contact the computer via an information transmission network.

12. The method according to claim 7, wherein the type of use is an examination carried out using the facility.

13. A method for economic evaluation of proper use of a facility in operation, which comprises:

obtaining data during proper use of the facility; said data being suitable for describing the proper use of the facility;

recording said data at the facility's location;

transmitting said data to a central database arranged at a location other than the facility's location;

categorizing transmitted data according to the type of use of the facility, using an evaluation facility associated with the database;

storing the transmitted data in collective files associated with the type of use on the basis of the categorization;

carrying out an economic evaluation of the proper use of the facility on the basis of the categorization of the transmitted data; and ascertaining a proposal for modifying the facility on the basis of the economic evaluation, wherein, the type of use is an examination carried out using the medical instrument, and the medical instrument is a magnetic resonance instrument, a computer tomograph, a lithotripter, an ultrasound instrument or an X-ray instrument.

14. The method according to claim 13, wherein the facility has a computer which automatically records the data during proper use of the facility to periodically determine a number of occurrences, in an observation time period, of each of plural types of use of the facility.

15. The method according to claim 13, wherein the computer is configured, independent of operator input, to contact the central database via an information transmission network and to transfer the collected data related to periodically determining the number of occurrences of each of plural types of use of the facility.

16. The method according to claim 13, wherein the central database can contact the computer via an information transmission network.

17. The method according to claim 16, wherein the information transmission network is a telephone network, the Internet, an intranet and/or an extranet.

18. The method according to claim 13, wherein the type of use is an examination carried out using the facility.

19. A method for economic evaluation of proper use of a medical equipment, comprising the steps of:

obtaining medical use data of a medical equipment, during use of the medical equipment, for each of at least three medical uses;

transmitting the obtained medical use data to a central database location remote from the medical equipment;

categorizing, at the central database location, the transmitted data according to each of the three medical uses;

storing the categorized data in three collective files, a first of the collective files being associated with a first of the three medical uses, a second of the collective files being associated with a second of the three medical uses, a third of the collective files being associated with a third of the three medical uses;

making an economic evaluation of the economic use of the medical equipment for at least one of the three medical uses by accessing the categorized data of the collective file associated with the at least one medical use; and developing a proposal for modifying the medical equipment based of the economic evaluation.

* * * * *